United States Patent
Kunze (10) Patent No.: US 9,836,818 B2
(45) Date of Patent: Dec. 5, 2017

(54) METHOD AND DEVICE FOR COLOR INTERPOLATION

(71) Applicant: BASLER AG, Ahrensburg (DE)

(72) Inventor: Jörg Kunze, Ahrensburg (DE)

(73) Assignee: Basler AG, Ahrensburg (DE)

( * ) Notice: Subject to any disclaimer, the term of this patent is extended or adjusted under 35 U.S.C. 154(b) by 0 days.

(21) Appl. No.: 15/313,368

(22) PCT Filed: May 28, 2015

(86) PCT No.: PCT/EP2015/061816
§ 371 (c)(1),
(2) Date: Nov. 22, 2016

(87) PCT Pub. No.: WO2015/189042
PCT Pub. Date: Dec. 17, 2015

(65) Prior Publication Data
US 2017/0186133 A1 Jun. 29, 2017

(30) Foreign Application Priority Data
Jun. 13, 2014 (DE) .................. 10 2014 008 686

(51) Int. Cl.
*H04N 5/228* (2006.01)
*G06T 3/40* (2006.01)
(Continued)

(52) U.S. Cl.
CPC ............ *G06T 3/4007* (2013.01); *G06T 5/002* (2013.01); *G06T 5/003* (2013.01); *G06T 5/20* (2013.01);
(Continued)

(58) Field of Classification Search
CPC ......... G06T 3/4007; G06T 5/003; G06T 5/20; G06T 7/90; G06T 5/002; G06T 3/40; H04N 9/045; H04N 2209/046; H04N 19/80
(Continued)

(56) References Cited

U.S. PATENT DOCUMENTS

2006/0098868 A1    5/2006    Fainstain et al.
2007/0153335 A1    7/2007    Hosaka
(Continued)

FOREIGN PATENT DOCUMENTS

DE    1160001 B    12/1963
DE    19836138 A1    2/2000
(Continued)

OTHER PUBLICATIONS

International Preliminary Report on Patentability, Application No. PCT/EP2015/061816, dated Aug. 23, 2016, 6 pages.
(Continued)

*Primary Examiner* — Yogesh Aggarwal
(74) *Attorney, Agent, or Firm* — Ziegler IP Law Group, LLC (57) ABSTRACT

A device and a method for processing image information from an image sensor by means of a mosaic filter having a two-dimensionally periodically repeating two-dimensional filter basis consisting of a plurality of different color components. A two-dimensional local environment having a predetermined number of pixels is constructed from temporarily stored color image data filtered by the mosaic filter, and a low-pass filtering (FC) occurs, wherein a separate low-pass filter mask depending on the current phase position of the local environment with respect to the periodic filter basis is applied to the local environment for each of the color components. Furthermore, all color image data of the local
(Continued)

environment are filtered by means of a high-pass filter (FH) having a predetermined filter mask, and the obtained high-pass-filtered color image data are added to corresponding low-pass-filtered color image data.

15 Claims, 8 Drawing Sheets

(51) Int. Cl.
*G06T 7/90* (2017.01)
*G06T 5/20* (2006.01)
*G06T 5/00* (2006.01)
*H04N 9/04* (2006.01)

(52) U.S. Cl.
CPC ............... *G06T 7/90* (2017.01); *H04N 9/045* (2013.01); *H04N 2209/046* (2013.01)

(58) Field of Classification Search
USPC ...................................... 348/222.1, 252–264
See application file for complete search history.

(56) References Cited

U.S. PATENT DOCUMENTS

| | | | |
|---|---|---|---|
| 2010/0039563 A1* | 2/2010 | Lukac | G06T 3/4015 348/663 |
| 2011/0090242 A1 | 4/2011 | Cote et al. | |
| 2012/0154596 A1 | 6/2012 | Wajs | |
| 2012/0212643 A1 | 8/2012 | Kanemitsu et al. | |
| 2014/0118582 A1* | 5/2014 | Artyomov | H04N 9/045 348/242 |
| 2014/0232711 A1* | 8/2014 | Park | G06T 5/003 345/212 |

FOREIGN PATENT DOCUMENTS

| | | |
|---|---|---|
| EP | 1395041 A2 | 3/2004 |
| EP | 2584782 A1 | 4/2013 |
| WO | 2011158572 A1 | 12/2011 |

OTHER PUBLICATIONS

International Search Report, Application No. PCT/EP2015/061816, dated Jul. 23, 2015, 4 pages.

* cited by examiner

| G | R | G | R | G |
|---|---|---|---|---|
| B | Ir | B | Ir | B |
| G | R | G | R | G |
| B | Ir | B | Ir | B |
| G | R | G | R | G |

61

| R | G | R | G | R |
|---|---|---|---|---|
| Ir | B | Ir | B | Ir |
| R | G | R | G | R |
| Ir | B | Ir | B | Ir |
| R | G | R | G | R |

62

| B | Ir | B | Ir | B |
|---|---|---|---|---|
| G | R | G | R | G |
| B | Ir | B | Ir | B |
| G | R | G | R | G |
| B | Ir | B | Ir | B |

63

| Ir | B | Ir | B | Ir |
|---|---|---|---|---|
| R | G | R | G | R |
| Ir | B | Ir | B | Ir |
| R | G | R | G | R |
| Ir | B | Ir | B | Ir |

METHOD AND DEVICE FOR COLOR INTERPOLATION

CROSS-REFERENCE TO RELATED APPLICATIONS

This application is a national stage patent application of PCT/EP2015/061816, filed 28 May 2015, which claims priority to German application 102014008686.0, filed 13 Jun. 2014, the disclosures of which are incorporated herein by reference in their entities.

FIELD

The invention relates to a device and a method for processing image information from an image sensor with two-dimensional pixel arrangement, in particular from a digital industrial camera having an image sensor and a mosaic filter.

BACKGROUND

In an industrial environment digital cameras are often used to monitor production processes, machines or objects, for example. Such industrial cameras are used for simple monitoring tasks and for metrological tasks such as for example quality control through image processing. They are characterized by their ease of integration into arrangements and high image quality.

Figure 1:
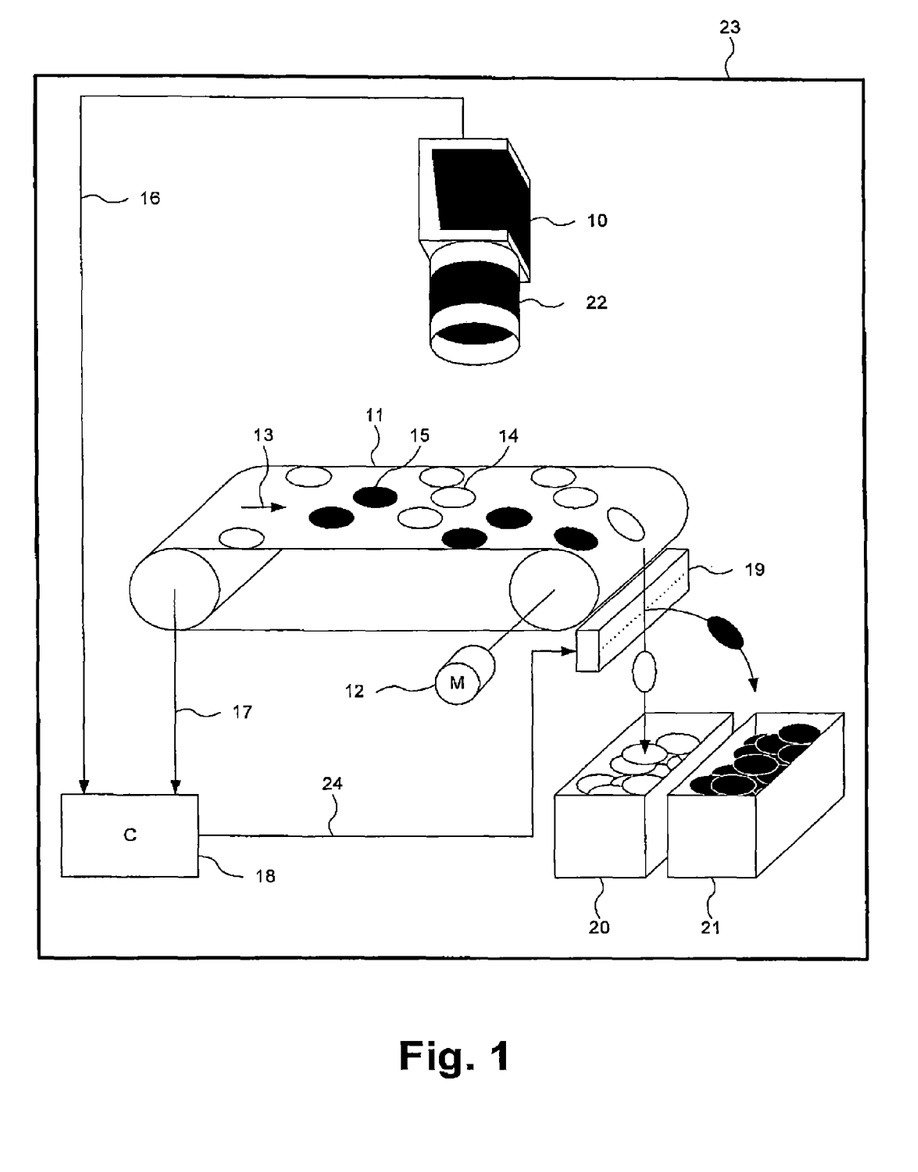
FIG. 1 shows a schematic principle representation of an exemplary application of an industrial camera.

FIG. 1 shows an exemplary application of a digital industrial camera. Digital industrial cameras 10 are intended for mounting in an industrial apparatus 23, as part of which they detect images of objects 14, 15 or e.g. persons. These images are transferred as image data 16, so that they can be evaluated and/or archived. The evaluation is often done automatically through an image processing device 18. In response to the results of evaluation automated actions are often performed, which are in context of the apparatus 23. In this way bright objects 14 and dark objects 15, which are distinguishable by their color, are automatically sorted based on optical criteria, for example. Such sorting is common in various industries. As an example, food, such as e.g. grains, is sorted based on the criterion of spotlessness, ore and rock based on its color or its luminance, postal items based on the address posted on them, brake discs or sealing rings based on the compliance with a correct shape and the compliance with certain desired dimensions, or empty returnable bottles based on a correct shape and the barcode attached thereon. Such sorting is often used for quality control or assurance.

Such industrial apparatuses 23 often comprise drive components which feed the objects 14, 15, e.g., a conveyor belt 11 with a drive motor 12 and a transport speed 13. The camera 10 captures the image at a suitable position by means of an optics 22, e.g., a lens. Thereby, the camera 10 can be configured as an area camera, a line camera or a multi-line camera, as described for example in EP 1 919 197 A2. The camera transmits image signals 16 of the captured images to an image processing device 18 (e.g. a computer (C)). Furthermore, an information 17 about a transport speed 13 of the conveyor belt 11 may optionally be supplied to the image processing device 18, which may for example be determined by a rotary transducer. Thereby, the image processing device can determine a suitable point in time, at which an object passes an actuator 19, e.g., an element with a plurality of controllable air valves, and can supply a control signal 24 thereto, based on which an action is performed, which is suitable to supply the corresponding object to a sorting. As an example, it can be specified by control of the air valves, whether the object falls into a first container 20 when the air stream is switched off or is deflected into a second container 21 when the air stream is switched on.

In such an application it is advantageous if the camera 10 can transfer the image as fast as possible, so that the image processing device 18 can produce the control signal 24 for the actuator 19 as soon as possible and thus the desired control action can be initiated as early as possible. Thereby, the apparatus 23 can be operated faster. In certain application cases, in particular if the objects 14 and 15 are moving on the conveyor belt 11, e.g. rolling, higher accuracy or precision can be achieved or other parameters can be optimized.

In other application cases, recording and/or documentation of a situation may be of interest. For example, images of vehicles may be recorded, which move irregularly in road traffic, e.g. when exceeding a speed limit or running a red light—as described for example in the DE 10 2010 003 039 A1. As an example, images of vehicles are also taken when ferry boats are loaded and unloaded, to determine whether a damage has occurred on the ferry boat in case of damage claims. Such applications require that the color of the objects and certain situations, e.g. red traffic lights, are reproduced correctly. Furthermore, it is important that the image is of good quality. This is among others the case, if the objects can be well recognized on the image and if for example writing, in particular such one with black and white contrasts, can be reproduced sharp and easily legible.

Figure 2:
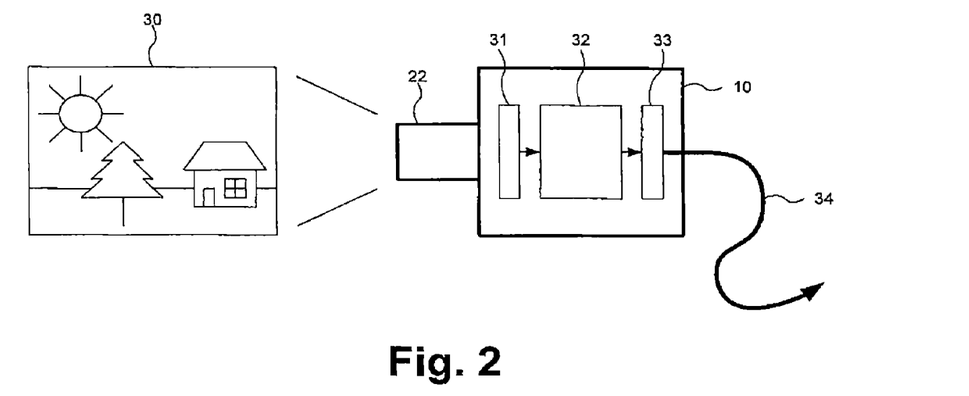
FIG. 2 shows an exemplary structure of a digital industrial camera.

FIG. 2 shows a schematic representation of a structure of a digital camera 10 with a lens 22. An image scene 30 is imaged via the lens 22 on an image sensor 31 which comprises a regular arrangement of light sensitive elements (image points, pixels). The image sensor 31 transfers electronic data to a computing unit 32 mostly provided in the camera 10, which includes e.g. a processor, a digital signal processor (DSP) or a so-called Field Programmable Gate Array (FPGA). It may thereby be required to convert analog image data into digital image data, e.g., by means of an analog-to-digital converter (AD converter). In the computing unit the image data is converted into a form which is usable by a user and then output as an electronic signal 34 via an interface 33.

Camera speed and image quality, in particular, are of decisive importance for the performance of a digital (industrial) camera. The latter is determined according to the standard EMVA 1288 (www.emva.org) in the actual version 3.0. Furthermore, subjective human recognition of the image is applied by the user as important criterion for judging image quality.

Digital industrial cameras are used in various industries, e.g., food industry, logistics, transport, automobile industry, robotics and others. Within these industries a lot of different applications with different requirements are provided, e.g., as to the size of the image sensor, the optical resolution which is given by the number of pixels, as to the repetition speed measured in images per seconds (fps), and as to the data transmission format, e.g., according to the standards CameraLink, IEEE 1394, GigE Vision or USB. There are digital industrial cameras which achieve high data rates, such as for example up to 800 MByte per second with CameraLink or up to 100 MByte per second with GigE Vision. To guarantee efficient production at such a variety of requirements, such cameras are often built in a modular construction, e.g., with a sensor module comprising an image sensor, a computation module and an interface module with an interface. As the computation module shall adapt a lot of different sensor modules and interface modules, it is helpful if the software is configurable, so that the multiplicity of types of computation modules and the development, production and logistical effort associated therewith can be reduced. Furthermore, it is important to achieve a high data throughput for obtaining the required high data throughput. To this end, the computation module is often realized by an FPGA as central component.

The number of operations contained in a mathematical image processing method should be as little as possible. In case of an FPGA this leads to a low use of logical cells, which is advantageous to be able to use a cheap FPGA or make available more free logic cells of the FPGA for other functions. In case of a DSP or another processor, a low number of operations means that they can be applied on a higher number of pixels within a given time period, whereby an image output at higher data rate can be achieved. Also, a lower number of image processing operations allows use of a low performance and thus cheaper processor and thereby a reduction of the circuit complexity.

Monochrome cameras as well as multicolor cameras are used as digital industrial cameras. The most common method of capturing color images is the use of a single image sensor on which a mosaic filter is mounted. A mosaic filter consists of a two-dimensional arrangement of color filters which impart different sensitivities for different colors to the different pixels. The arrangement is often selected so that a filter basis is two-dimensionally periodically repeated.

FIGS. 3a-d show different color filter arrangements for mosaic filters with two-dimensionally repeating filter basis 40-43 of the size of 2×2 pixels.

An arrangement which is particularly often used for mosaic filters is the so-called Bayer pattern, which is known from the U.S. Pat. No. 3,971,065 and shown in FIG. 3a. It has a filter basis 40 of size 2×2 which is periodically repeated. The filters comprise colors red (R), green (G) and blue (B). The color green occurs twice as likely as the color blue.

For certain applications it might be required that the color infrared (Ir) is also captured in addition to the visible colors, e.g., R, G and B. The color infrared is not visible to humans, but can be captured by digital cameras. This is of great benefit e.g. in the food industry where, due to the four-dimensional red, green, blue and infrared (RGBIr) color information, bad old fruit can be much better distinguished from fresh fruit than would be the case on the basis of a red, green and blue (RGB) image. In the timber industry blemishes can be distinguished by RGBIr images from resinous parts of same RGB color, of which only the first ones affect the dead weight of a board or beam.

Figure 3:
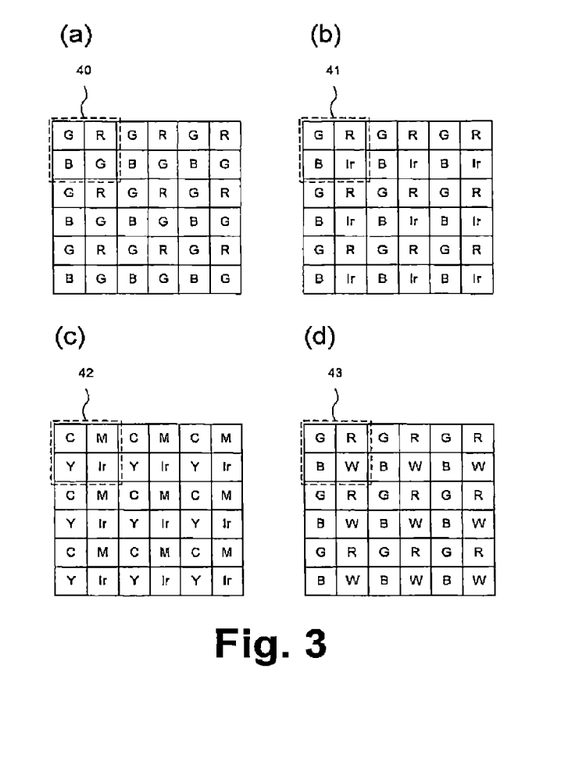
FIGS. 3a-3d show schematic representations of different mosaic filters.

FIG. 3b shows a mosaic filter comprising the colors R, G, B and Ir, which has a filter basis (41) of size 2×2.

Furthermore, FIG. 3c shows a mosaic filter comprising the colors cyan (C), magenta (M), yellow (Y) and infrared (Ir), which also has a filter basis (42) of size 2×2.

Further mosaic filters with four different colors and a filter basis of size 2×2 are possible as well. As an example, FIG. 3d shows a mosaic filter comprising the colors R, G, B and white (W). The color white is sometimes also designated as "clear".

When a mosaic filter is used, many applications require that a color image comprising several color values per pixel is generated from the raw data of the image sensor which comprises only one respective color value per pixel. Depending on the kind of mosaic filter, this process is called demosaicing, debayring or color interpolation. To this end, very often images with three color values per pixels are calculated, e.g., RGB, which can be displayed as color image on screens or printed by printers on paper. However, to achieve technical objects, e.g., for quality control, generation of images with more than three colors may be desired as well, e.g., with the four colors R, G, B and Ir.

Optionally, other information than color information may be allocated to single pixels or image areas. As an example, a three-color RGB image may be produced with a four-color mosaic filter, wherein an additional depth information may be allocated to individual image areas.

High-quality color interpolation is mainly characterized by good color reproduction in the resulting image. In this respect, it is particularly important that the colors of the imaged original are reproduced as genuine as possible. Here, known problems mainly occur at high spatial frequencies, e.g., at luminance or color edges. In particular, color fringes and color aliasing give rise to problems here.

Furthermore, color errors with a period of any two pixels are known, which are called zipper artefacts or zippering effects and which are recognized disturbing by a viewer.

Moreover, high quality color interpolation is characterized by a good structural reproduction. The structural reproduction is good for certain applications if it is faithful, which means if low and especially spatial frequencies are reproduced faithfully, e.g., by automated spatial measuring with sub-pixel accuracy. In other applications, structural reproduction is experienced as particularly good, if high frequencies are reproduced in an emphasized manner, whereby the image appears particularly sharp, e.g., for locating low-contrast edges. Here, known problems are a possible blur as well as a blocking artefact, which often occurs at a size of 2×2, when inferior color interpolation methods are used. Noise is experienced as very negative in the structure as well. On the one hand there are also specific applications in which a high signal-to-noise ratio (SNR) is provided, so that no disturbing noise is experienced, while it is important at the same time that fine details are visible as well, e.g., when thin film transistor screens (TFT displays) are checked. On the other hand, there are also certain applications in which fine details of minor importance are disturbing, while it is very important that the noise of the image is low, e.g., to achieve economical transmission bandwidths of compressed images.

Furthermore, it can be concluded that an image of a good digital camera is perceived as of high quality especially if it has a good signal quality, in particular a low noise and therefore a high signal-to-noise ratio (SNR) and is free of artefacts which a human viewer would experience as disturbing or which would influence computer algorithms in their function.

Typically, raw images are read out progressively from image sensors and are also transmitted progressively. However, for cost reasons it is desirable to keep storage requirements, bandwidth for memory access and computation effort as small as possible. Furthermore, applications require to achieve high image repetition rates and high data rates associated therewith. Industrial applications often require output of captured images at a low time latency, so that fast machines can be controlled by image processing.

It is an object of the invention to provide a camera having an image sensor with a mosaic filter, wherein a high quality color image with low latency and high image sharpness can be generated by color interpolation while preventing noise and disturbing artefacts.

SUMMARY

According to the invention this object is achieved by an apparatus according to claim 1, a digital camera according to claim 10, a method according to claim 14 and a computer program according to claim 15.

Accordingly, an image processing on the basis of a predetermined local environment can be performed by the solution according to the invention, wherein low noise color values can be obtained by binomially composed low-pass filters which are applied to image data of a respective single color component of the local environment, only. In this respect, the allocation of results of the low-pass filters to the color components is performed in dependence on the local phase position of the local environment in relation to the color distribution of the mosaic filter. Furthermore, a structural value is obtained from the predetermined local environment by high-pass filtering of the color image data. The remarkable effect with this structural value is that it does not depend on a single color component, but is applied independent from the spatial phase and without consideration of the color allocation of the respective raw image values. The addition of a common high frequency component is advantageous in that thereby color noise which is experienced as disturbing is not further increased. Thereby, much better image quality can be achieved with simple and compact image processing.

According to a first advantageous development, the device may comprise a pipeline architecture, in which the image data filtered by the mosaic filter are loaded pixel-wise into a memory based on a clock signal and the processing of the image data in the low-pass means, the high-pass means and the adding means is performed by a processor which outputs image data on a regular basis based on the clock signal for a color-interpolated pixel of the resultant image in dependence on the clock signal. Interpolation at high data processing speed is possible, since Field Programmable Gate Arrays (FPGAs) are often used for implementation.

According to a second advantageous development the processor is adapted to perform the processing of the color image data in such a manner that calculations in relation to the local environment are horizontally and vertically mirror-symmetrical and rotationally symmetrical by 90°. Thereby, disturbing anisotropic effects can be prevented or at least reduced.

According to a third advantageous development the noise reduction means is adapted in such a manner that noise reduction is achieved by a non-linear function which passes through the origin of the associated coordinate system and the gradient of which is smaller in the origin than at at least one location remote from the origin. As an example, the function may also be a piece-wise linear function.

According to a fourth advantageous development the filter masks may be formed of a matrix, wherein the low-pass filter means and the high-pass filter means are adapted to multiply data values of the pixels by filter values indicated in the matrix at a corresponding location, to add up the obtained products of all pixels of the local environment, and to multiply the result by a common factor allocated to the matrix. This enables an easy adaptation of the image processing to changed environmental conditions or other influencing parameters.

According to a fifth advantageous development the filter values of the matrices of the filter masks comprise positive or negative powers of two, only, and the product of the sum of all filter values and the common factors generates the value of one. Thereby, it can be achieved that the absolute color intensity of color areas is not changed by the filter effect.

According to a sixth advantageous development the high-pass filter means may comprise a noise reduction means or an image sharpening means or both, which are each controllable by an adjusting parameter. Thereby, image quality can be further improved.

According to a seventh advantageous development the filter values of the matrix of the high-pass filter means comprise positive and negative powers of two, only, and the sum of all filter values is zero. This leads to the result that the filtered image signal has no direct component and that the high-pass filter means thus completely blocks for very low frequencies, whereby false colors and zipper artefacts can be prevented. The positive and negative powers of two can be implemented in a very resource-saving manner, e.g., in an FPGA.

BRIEF DESCRIPTION OF THE DRAWINGS

The present invention is now described in more detail based on preferred embodiments with reference to the drawing figures, wherein:

FIG. 10 shows different filter masks for deriving the structure of a high-pass filter stage;

FIG. 11 shows a filter mask for determining a high frequency component of the luminance information in the second embodiment.

DETAILED DESCRIPTION

According to the following embodiments a multicolor digital industrial camera with modified and thereby more effective image processing is described. The capturing of color images is performed by using a mosaic filter having a predetermined pattern.

Figure 4:
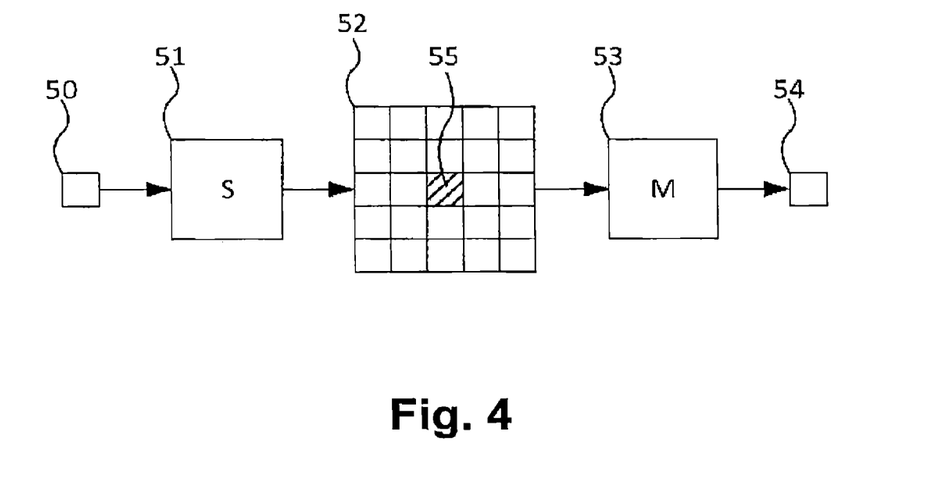
FIG. 4 shows a schematic pipeline architecture for a local image environment according to a first embodiment.

FIG. 4 shows a schematic pipeline architecture for a local image environment according to a first embodiment. More specifically, it is suggested here to perform color interpolation by means of a pipeline architecture. This pipeline architecture can be well implemented in FPGAs at reduced resource effort. Due to the fact that lots of digital industrial cameras comprise FPGAs the method can be implemented in existing and new modules without additional components and costs associated therewith. Furthermore, high data rate and low latency can be achieved with this kind of implementation.

According to this pipeline architecture raw data pixels 50 are supplied in a regular manner from an image sensor (not shown in FIG. 4) as progressive input signal based on a clock. These are temporarily stored in a cheap and small memory (S) 51 until raw data pixels of several consecutive lines of the image sensor are provided. Based on these raw data pixels a local environment 52 with a central data pixel 55 is built up, which serves as a basis for a computer based image processing in an image processing processor (e.g. a mathematical machine, M) 53. The image processing processor 53 then outputs a color interpolated resultant data pixel 54 in a regular and clock dependent manner.

In particular, such an implementation means an intentional omission of a successive calculation of complete partial images, e.g., images of different color or luminance, structural, contrast or noise information. As this would lead to an increased memory requirement for buffering these images and also to a very much higher latency, so that the resultant data pixel 54 would be available much more later in this case.

Furthermore, it is suggested performing the computation in the image processing processor 53 in such a manner that it is horizontally and vertically mirror-symmetrical as well as rotational symmetrical by 90°. Since the mathematical calculation performed by the image processing processor 53 requires the corresponding environment 52 as input data, the environment 52 should preferably be selected to be square.

Furthermore, it is suggested selecting the size of the environment 52 preferably as an uneven number, measured in lines and columns. With such a kind of selection, the central data pixel 55 is always provided and thus at least one luminance value is always available for the central pixel location of the environment 52, for which the resultant data pixel 54 is calculated. This facilitates the finding of a suitable calculation method for the image processing processor 53.

Preferably, the environment 52 may be selected of a size of 5×5 pixels. Namely, to be capable of reducing color noise for all respective colors, it is required that more than one raw data pixel is provided for each color in the environment 52. Considering the mosaic filters shown in FIG. 3b an environment of the size 5×5 is the smallest environment having an uneven number of lines and columns, which meets this requirement. However, each larger environment, e.g., 7×7 or 9×9, requires more storage capacity and a higher bandwidth for memory access, which leads to higher resource requirements.

Moreover, it is suggested according to the first embodiment to use the color values of the color components R, G, B and Ir for color interpolation, for example. In this respect, these color values may preferably be determined in such a way that high frequencies of chrominance information are underrepresented and thus the chrominance information is available at low frequency only. This approach is related to the physiology of human vision. And that means it is known that luminance sensitive rods in the retina of the human eye are provided at very much higher density than chrominance sensitive cones. Thus, the sampling frequency of the human eye is lower for chrominance information than for luminance information.

Experiments with different test persons have shown that the test persons were not able to recognize the missing of high chrominance spatial frequencies, while the test persons have reacted in a very sensible manner to the missing of high frequency luminance information. In other experiments a slightly increased chrominance noise was already judged by a human viewer as clearly disturbing. On the other hand, it could also be observed that the high frequencies of luminance information were very important for the judgement of image quality by the test persons. By contrast, the removing of high frequency chrominance information from the image was perceived by many viewers as an increase of image quality. This arises from the fact that thereby the high frequency part of the chrominance noise is also removed from the image.

Figure 5:
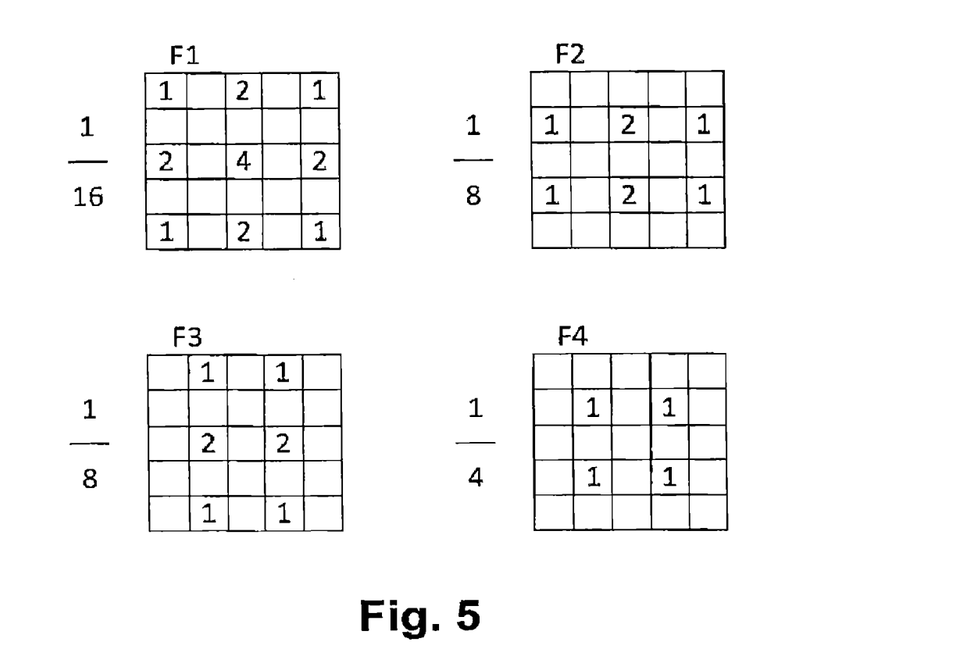
FIG. 5 shows phase-dependent filter masks for determining a low frequency chromatic information in different embodiments.

FIG. 5 shows phase dependent filter masks (or filter kernels) for determining a low frequency chrominance information in different embodiments.

The filter masks are applied as convolution operations, for example. Therein, the respective raw data value of the position shown in the filter matrix is multiplied by the value indicated in the filter matrix, the products resulting therefrom are added up and multiplied by the value (1/16, 1/8, or 1/4, respectively) indicated in FIG. 5 in front of the filter matrix. The mathematical operations required therefore may of course also be performed in a different sequential order.

The filter matrices F1, F2, F3 and F4 depicted in FIG. 5 are occupied at predetermined pixel locations of the local environment only and provide the advantage that each of them only influences one of the four color components of the preceding mosaic filter. Thereby, false colors can be prevented. Also, the filter matrices F1 to F4 satisfy the above mentioned symmetrical characteristics. The sum of their filter values amounts to one when considering the multiplication by the respective common factor, so that the absolute color intensity is not changed by their application on color areas. Moreover, they have a filter characteristic which is matched to each other. The contained exclusively positive and negative powers of two can be implemented in a particularly resource saving manner in an FPGA. Finally, it is possible to determine noise propagation by the laws of error propagation and it can be shown that all filter matrices F1 to F4 lead to a reduction of noise. This may also be explained by the fact that noise at high frequency components is removed by the filter effect.

Figure 6:
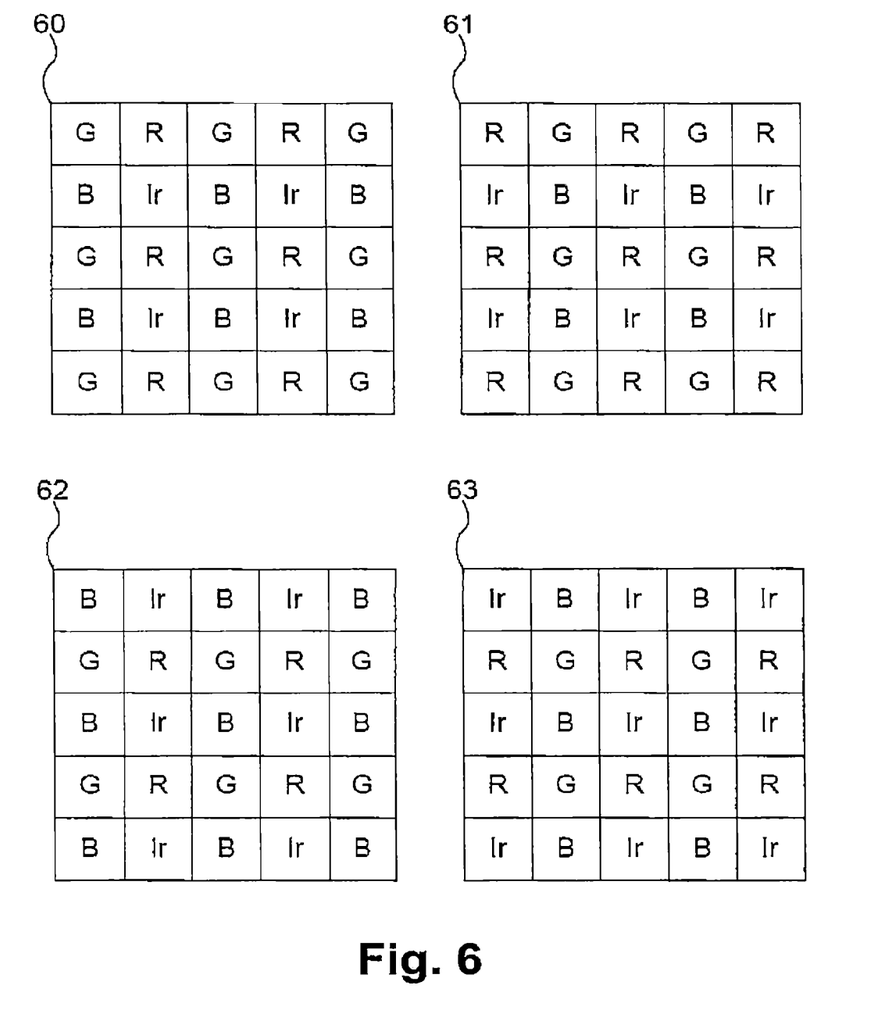
FIG. 6 shows different phase positions of the image data in the local environment.

FIG. 6 shows different phase positions of the image data in the local environment (e.g. environment 52 in FIG. 4). In case of a continuous application of the proposed filter matrices to the raw data of the image, each of the image data is provided in one of the four phase positions 60, 61, 62 or 63 shown in FIG. 6. This leads to the situation that the positive filter values or filter factors of the different filter matrices F1 to F4 are each allocated to different color components. In the above examples, in the phase position 60, the result of the application of the filter matrix F1 is allocated to the color component G, the result of the application of the filter matrix F2 to the color component B, the result of the application of the filter matrix F3 to the color component R, and the result of the application of the filter matrix F4 to the color component Ir. In the phase position 61, however, the result of the application of the filter matrix F1 is allocated to the color component R, the result of the application of the filter matrix F2 to the color component Ir, the result of the application of the filter matrix F3 to the color component G, and the result of the application of the filter matrix F4 to the color component B. In the phase position 62 the result of the application of the filter matrix F1 is now allocated to the color component B, the result of the application of the filter matrix F2 to the color component G, the result of the application of the filter matrix F3 to the color component Ir, and the result of the application of the filter matrix F4 to the color component R. Finally, in the phase position 63, the result of the application of the filter matrix F1 is allocated to the color component Ir, the result of the application of the filter matrix F2 is allocated to the color component R, the result of the application of the filter matrix F3 to the color component B, and the result of the application of the filter matrix F4 to the color component G.

Figure 7:
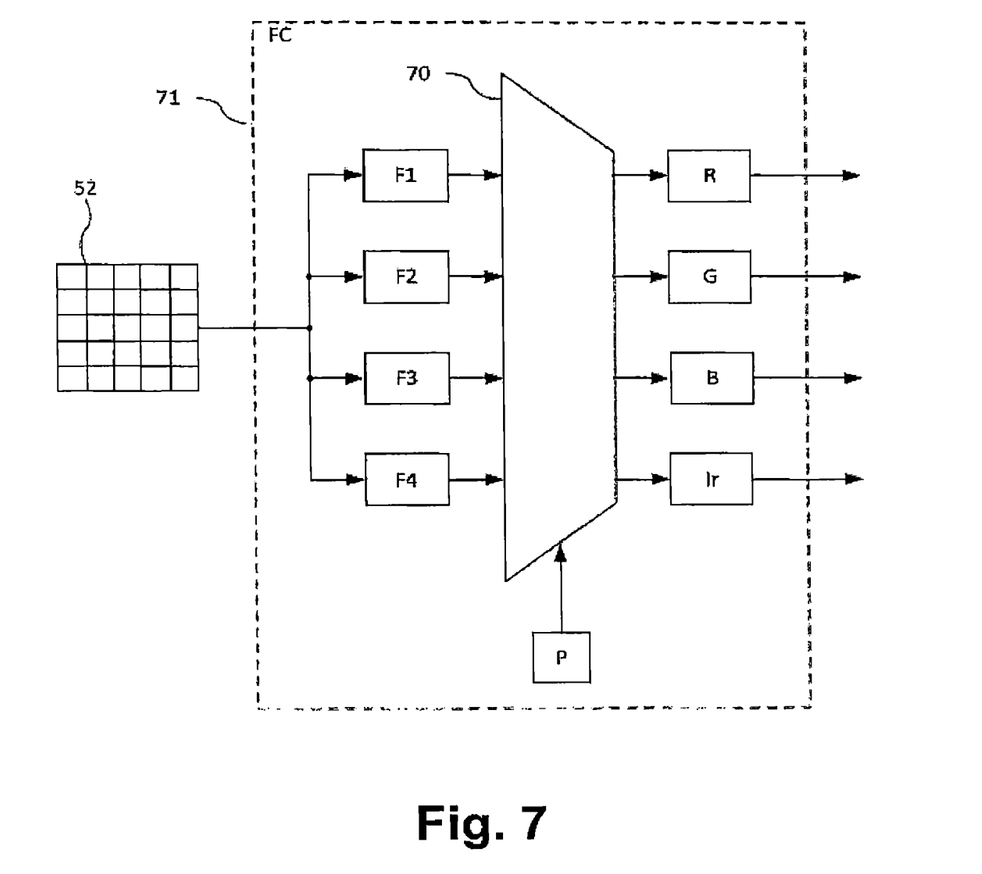
FIG. 7 shows a schematic block diagram of a low-pass filter means for selecting the chromatic information according to a second embodiment.

FIG. 7 shows a schematic block diagram of a low-pass filter means (FC) 71 for selecting the chrominance information according to a second embodiment. The low-pass filter means 71 shown in FIG. 7 can be realized as discrete hardware circuit or as software program for controlling an image processing processor.

Due to the phase position shown in FIG. 6 a control signal P indicating the phase position is generated in the low-pass filter 71 according to the second embodiment, which is used to control a selection means 70 which allocates the result of the convolution operation by the filter matrices F1 to F4 to the respective color R, G, B or Ir, in the manner of a multiplexer or a selective switch. The control signal P can be obtained by determining the current phase position (e.g. by comparison with the available phase positions 60 to 63 and their characteristic features), wherein this phase position can then be coded as a number, a bit sequence or a symbol. Depending on the control signal P a selection may then be performed e.g. by means of digital operations in the selection means 70. It is to be noted that, as an alternative, a filter matrix corresponding to the respective color component may of course also be selected in dependence on the control signal P and by maintaining the value for the respective color it may be applied to the environment 52. By this selection means 70 values for the four colors R, G, B and Ir are obtained. In accordance with the low frequency design of the filter matrices F1, F2, F3 and F4 especially low frequency components are well represented in the color values obtained after the filter operation, while the high frequency components are intentionally mainly removed. The process of this selection and allocation may as well be designated as color selection.

Figure 8:
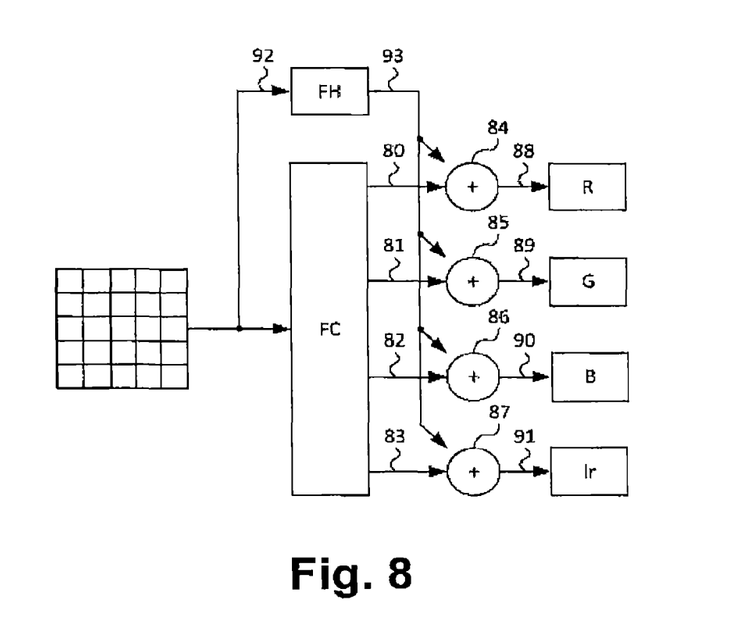
FIG. 8 shows a schematic block diagram of a processing part for adding a high frequency component in the second embodiment.

FIG. 8 shows a schematic block diagram of a high frequency filter means FH for adding a high frequency component in the second embodiment. In the block diagram of FIG. 8 the block FC corresponds to the low-pass filter means 71 shown in FIG. 7, at least with regard to its effect.

As shown in FIG. 8, in the present enhancement of the second embodiment it is suggested determining the missing high frequency component 93 in the resultant color data 80 to 83 (e.g. R, G, B and Ir) at the output of the low-pass filter means FC by an additional filter means, namely a high-pass filter means FH, from the raw color image data 92 of the local environment and adding it to the chrominance information of the resultant color data 80 to 83 by corresponding adders 84 to 87, to thereby obtain improved output color data 84 to 87. Thereby, an image of color data 88 to 91 (e.g. R, G, B and Ir) is obtained, which provides a significantly improved image sharpness.

The reason for the previous non-sharpness lies in the fact that the color components of the color channels could be determined by low frequency filter matrices due to the low color density in the mosaic filter, which low-pass characteristic was used to reduce the chrominance noise. Therefore, the image of the resultant color data 80 to 83 determined by the low-pass filter means FC tends to appear blurred but also with low noise. The rational for the addition of the common high frequency component 93 is that the color information of low scale in images, i.e. at high spatial frequencies, is well correlated. The addition of the common high frequency component 93 is advantageous over the use of individual high frequency components for the respective color component in that thereby the chrominance noise, which is perceived as disturbing, does not increase anymore, but rather grey noise is added at most, which is perceived as less disturbing by the viewer.

Figure 9:
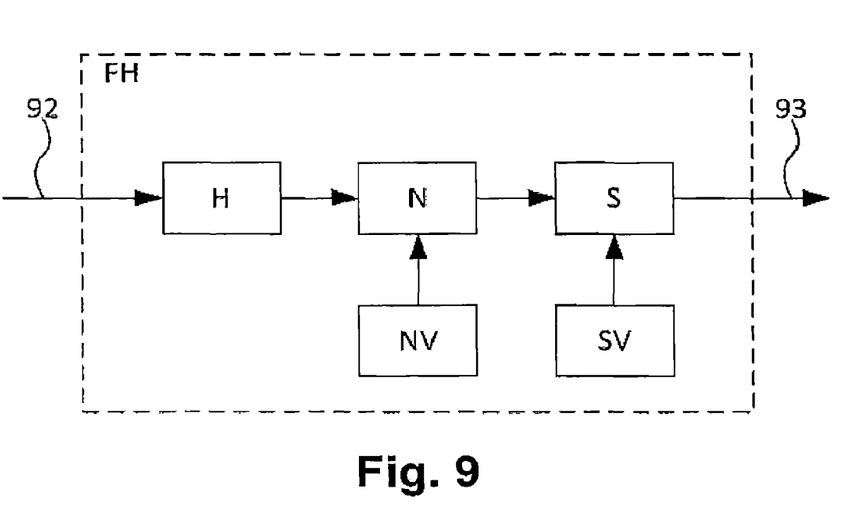
FIG. 9 shows a schematic block diagram of a structure of a high-pass filter stage according to the second embodiment.

FIG. 9 shows a schematic block diagram of a structure of a high-pass filter stage according to the second embodiment.

In FIG. 9 an exemplary configuration of the high-pass filter stage FH of FIG. 8 is shown. Therein, a high-pass filter H is initially applied to the raw color image data 92 of the environment, then a noise reduction N and finally a sharpening S. By means of the high-pass filter a high frequency component is filtered out, the noise of which is reduced by the noise reduction N and the image sharpness is increased by the sharpening S.

The noise reduction N may for example be realized by using a non-locally working algorithm, e.g. a so-called Non-Local Means Algorithm. Also, a bilinear filter algorithm can be used in which the signal to be filtered should be provided at the output of the high-pass filter H for each pixel. Furthermore, a non-linear operation can be performed for each signal of the high-pass filter H for each pixel of the environment for each environment 52 belonging to a central pixel 55 to achieve a bilinear filtering. If for example a median filtering is to be applied, the signal to be filtered should again be provided as output of the high-pass filter H for each pixel of the environment, which also requires an additional intermediate storage.

More specifically, a setting parameter NV may be provided for setting the noise reduction N, and a setting parameter SV for setting the sharpening S. Thereby, the quality impression of the resultant image can be controlled individually by changing the setting parameters NV and SV and can thereby be improved.

The noise reduction N may for example be adapted by means of the setting parameter NV to the noise level actually available in the image, so that a too little noise reduction can be prevented on the one hand, in which only parts of the noise are removed. On the other hand, a too high noise reduction can be prevented, in which not only noise but also texture information is removed from the image and the perception of sharpness is reduced.

The value of the setting parameter NV can be set by the user so that the image appeals especially pleasant or high end to him. Furthermore, the value of the setting parameter NV may as well be selected on the basis of the knowledge of the strength of the noise in the image. To achieve this, the strength of the noise may be determined from the image itself or from successive images. Furthermore, the strength of the noise can be calculated from the characteristics of the camera, e.g., dark noise and amplification, e.g. by applying the formula of the standard EMVA 1288. Therein, the spatial as well as the time dependent noise is to be considered. Due to the fact that the standard EMVA 1288 indicates the noise for respective single pixels only, the propagation of the noise in the high frequency filter means FH is to be considered as well. This can be obtained for example by applying the Gaussian error propagation law to the spatial and time dependent noise.

Since the noise of a pixel is also dependent on its luminance, it may be advantageous to incorporate the luminance of the central pixel 55 or an average luminance of its environment into the calculation of the setting parameter. To achieve this, individual color values or an average value as well or other combinations of the color values determined through the FC can be used, for example.

The setting parameter SV can be used to adapt the sharpening S to a desired amount, so that too little sharpening can be prevented, at which the image or parts of the image appear blurred. On the other hand, a too high sharpening can be prevented, which would lead to a non-natural image perception.

Since it is disadvantageous for the application of certain image processing algorithms, if a sharpening is applied, the setting parameter SV may be set to a neutral value for such applications, e.g. to 1. For applications, in which images are commonly judged by humans who mostly prefer stronger contrasts, the setting parameter SV may be set to a fixed higher value, e.g. 1.5 or 2. Furthermore, the setting parameter may be selected lower in images which generally comprise a higher portion of local contrasts, since a further sharpening of very contrast-rich images is often perceived as uncomfortable by a viewer, e.g., in images with a high textural portion. On the other hand, the setting parameter may be selected higher for images which principally comprise low contrasts and low sharpness, because this is often perceived by the viewer as more comfortable, more brilliant or of higher quality. Also, the setting parameter may be adapted locally, so that such portions of the image, which are likely to be blurred, are sharpened stronger than such portions of the image which are likely to be sharp. Due to the fact that particularly images which are captured by a lens with low aperture value have a low depth of focus, the perceived depth of focus can thereby be increased.

Of course, the noise reduction N can be dispensed if for example no noise reduction is desired due to the noise included in the image. Similarly, sharpening can be dispensed if for example no sharpening is desired for meeting input requirements of subsequent image processing. Also, noise reduction and sharpening may be exchanged in their sequence, wherein the suggested arrangement provides the advantage that the value of the setting parameter NV can be set independent from the value of the setting parameter SV.

FIG. 10 shows different filter masks for deriving the structure of the high-pass filter stage according to FIG. 8. Boundary conditions to be assumed consist of the above mentioned symmetrical conditions, the freedom from a direct component since otherwise color alias would have to be feared, the adaptation of the filter frequency to the filter matrices F1, F2, F3 and F4 and the prevention of zipper artefacts.

Assumed are the color components C1, C2 and C3 of the pixels for the phase position P, at which the coefficients of the filter matrices F1, F2 and F3 are all non-zero. Then, a color value for the central pixel 55 can be calculated or respectively estimated for the color components C1, C2 and C3 by application of the filter masks Z1, Z2 and Z3 on the environment 52 according to FIG. 4. In case of the filter mask Z1 this is performed by direct reading and in case of the filter masks Z2 or respectively Z3 by calculating the arithmetic mean of the vertical or respectively horizontal neighboring pixels with corresponding color component. By subtracting the filter matrices F1, F2 and F3 from the filter matrices Z1, Z2 and Z3, high-pass filter matrices H1, H2 and H3 can be calculated, which are each free of direct component and adapted to the frequency selection behavior of the low-pass filter masks F1, F2 and F3. If the high-pass filter masks H1, H2 and H3 are now added, the structure of the high-pass filter stage FH according to FIG. 8 is obtained.

Thereby, the filter matrix shown in FIG. 11 is provided for determining the high frequency component of the luminance information by the high-pass filter stage FH. It meets the above mentioned symmetrical characteristics and comprises a frequency characteristic which is adapted to the filter which is matched to the filter matrices F1 to F4. Particularly, the sum of all of its filter values amounts to zero, so that it is free of direct component and thus blocks very low frequencies entirely, whereby false colors can again be prevented. It only comprises positive and negative powers of two as factors or filter values, which can be implemented in a very resource saving manner in an FPGA. Furthermore, zipper artefacts can be prevented by the filter matrix according to FIG. 11. As a result, the use of the filter matrix shown in FIG. 11 leads to a further improvement of image quality.

Figure 12:
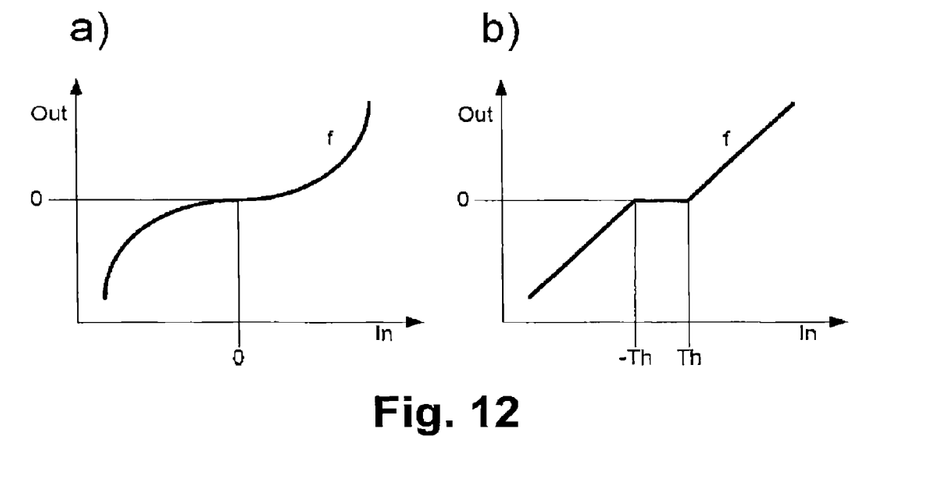
FIGS. 12a and 12b show schematic diagrams with a non-linear function or, respectively, piece-wise linear function for noise reduction.

FIGS. 12a and 12b show schematic diagrams of a generally non-linear function f (FIG. 12a) which shows a minimum gradient in the vicinity of the origin, and a piece-wise linear function f (FIG. 12b) for noise reduction. Such a function can be used for realizing the noise reduction N in FIG. 8, wherein the input signal In is plotted at the horizontal coordinate axis and the output signal Out is plotted at the vertical coordinate axis.

The use of such a non-linear function f is based on the knowledge that the structural values are subjected to noise of a certain noise amplitude. It is therefore advantageous, to subject values within the noise amplitude to the function f in such a manner that the noise is reduced. According to the teaching of error propagation, noise which is interpreted as a measurement error of a pixel, is reduced by a function f, if the first gradient of this function f applied to the noisy parameter is small in its absolute value. It is therefore advantageous to keep the absolute value of the gradient of the function f small near to the origin, i.e. with its absolute value within the noise amplitude. In particular, it is especially advantageous if the gradient of the function f in the vicinity of the origin and within the noise amplitude is zero in its absolute value and the function f itself is zero there, because then according to the teaching of error propagation no noise remains within the noise amplitude after the application of the function f, because this is removed from the image by application of the function f. Therein, it is accepted that structures with an absolute value below the noise amplitude are also removed from the image. This is however not seen as a disadvantage since such structures have a low visibility anyway, because they are hidden by the absolute value of the higher noise. Such functions f are also called expansion or expand functions.

The non-linear function f thus has the characteristic that it is continuous, runs through the origin of the corresponding coordinate system, is constant or monotonically increasing everywhere and that the gradient is smaller in the origin than at at least one location remote from the origin. FIG. 11a shows such a function as an example. A scaling with a parameter Th may be applied here by applying the function on the product of the input parameter and the parameter Th and multiplying the obtained functional value by 1/Th.

FIG. 12b shows a piece-wise linear function f, which has a value of zero within an interval from −Th to Th and above and below the gradient 1. Therein, Th is a threshold value and it is suggested to set it on the basis of the value of the noise reduction setting parameter NV, e.g. by equation. This piece-wise linear function f has the advantage that it can be implemented in an FPGA in a very resource saving manner.

A possible embodiment of this function f with the above mentioned advantages can be formulated as $f_{thr}(x) = x - \text{thr}$, if $x > \text{thr}$ $x + \text{thr}$, if $x \leftarrow \text{thr}$ 0 otherwise.

Furthermore, it is suggested applying the sharpening S by multiplying the input value with a value which is selected based on the value of the setting parameter SV, e.g. by equation.

Thereby, a color interpolation of raw image data of a mosaic filter having four different colors and a filter basis of size 2×2 can be performed at high quality with low resource requirements and low latency.

The teaching explained here for the values R, G, B and Ir can be directly transferred to other mosaic filters, in which a filter basis of size 2×2 is repeated two-dimensionally periodically, by substituting the colors. As an example, it can also be applied to filters with the colors R, G, B and W, with the colors R, G, B and E or with the colors C, M, Y, Ir.

It is possible to output the four obtained color values together. Furthermore, it is also possible to output only a part of the color values, e.g. to obtain a RGB color image. Furthermore, it is possible to transfer the obtained color values into a different color space, e.g. in the YUV or YCrCb color space.

In general, the considerations and technical solutions which have been designed for an FPGA can be transferred to a digital signal processor (DSP) or another processor. The operations can be performed in a camera, in a video box, in a frame grabber, or in a computer.

Preferably, operating elements for setting the values of the parameters Th, NV, SV can be provided. It is further possible to provide a computer program by which a user can input or set the value of Th, NV, SV, e.g., with the help of an input panel or a slider or a rotary knob implemented in software.

Numerous of the filter or convolution matrices proposed in the embodiments show systematical similarities. As it is generally more resource saving to calculate an average value from two previously determined values than to apply a convolution matrix to an environment, such systematical similarities can be exploited so as to reduce the calculation and thus the resource effort.

Furthermore, the storage and calculation effort at progressive readout can be reduced by exploiting temporary and spatial connections, so that further resource savings are possible. If the horizontal pixels are transferred from right to left in a manner so that during the transmission of a line and while neglecting the problems in the edge region one pixel is transferred with each clock, the values within the environment move one position to the left with each clock. By these and numerous other combinations the number of calculation operations to be performed is reduced substantially, whereby less resources need to be applied for calculation.

The suggested image processing processes can be applied in cameras as well, in which computing unit no FPGA is used as central component, but a DSP. The mathematical image processing processes explained in the embodiments for a computation unit of a camera can be applied in a frame grabber or in a processor of a computer in case raw data are directly transmitted from the camera, in particular by using a software controlling the corresponding process steps, e.g., of a driver.

Furthermore, the skilled person is able to transfer the explained teaching to cameras which image sensors are equipped with other color patterns which comprise the color components R, G, B and Ir in another arrangement or more or few or other color components than R, G, B and Ir. If for example five or more color components are used, the teaching explained herein for R, G, B and Ir is to be transferred to the used four color components and to be enhanced by a further color component.

If the teaching mentioned here is applied to mosaic filters with white color component (W) it is recommended to derive the high frequency filtered image information from the white pixels, since the color white has an especially advantageous signal-to-noise ratio.

If the teaching mentioned herein is applied to mosaic filter which spatial period exceeds a value of two pixels, it may be required to use a bigger local environment than a 5×5 environment, to thereby ensure that for each color component more respective pixels are provided in the environment and to also meet the required symmetrical characteristics.

The presented alternative solutions according to the embodiments can be used in connection with various image recording devices and cameras with mosaic filters or similar filter structures.

To summarize, a device and a method for processing image information from an image sensor with a mosaic filter having a two-dimensionally periodically repeating two-dimensional filter basis consisting of a plurality of different color components have been described. A two-dimensional local environment having a predetermined number of pixels is constructed from temporarily stored color image data filtered by the mosaic filter, and a low-pass filtering (FC) occurs, wherein a separate low-pass filter mask depending on the current phase position of the local environment with respect to the periodic filter basis is applied to the local environment for each of the color components. Furthermore, all color image data of the local environment are filtered by means of a high-pass filter (FH) having a predetermined filter mask, and the obtained high-pass filtered color image data are added to corresponding low-pass filtered color image data.

The invention claimed is:

1. An apparatus for processing image information from an image sensor (31) with two-dimensional pixel arrangement, wherein the apparatus comprises
    a mosaic filter allocated to the image sensor (31), which comprises a two-dimensionally periodically repeating two-dimensional filter basis (40) of several different color components;
    a storage means (51) for storing color image data filtered by the mosaic filter and for building a two-dimensional local environment (52) with a predetermined number of pixels;
    a low-pass filter means (FC) for low-pass filtering the color image data of the local environment (52), wherein for each of the color components another low-pass filter mask from a group of low-pass filter masks (F1-F4) available for each phase position (60-63) of the local environment (52) in relation to the periodic filter basis (40) is selected in dependence on the current phase position and applied to the local environment (52), wherein in the respective low-pass filter mask (F1-F4) each of the filter values which are to be multiplied with the color values of other color components are zero, and wherein the phase position indicates the spatial arrangement of the color components of the pixels in the local environment (52);
    a high-pass filter means (FH) for high-pass filtering the color image data of the local environment (52) with a predetermined high-pass filter mask, which is independent from the phase position, for obtaining a common high frequency component (93) of the color image data; and
    an adding means (84-87) for pixel-wise addition of the common high frequency component (93) of the high-pass filter means (FH) to corresponding output image data (80-83) of the low-pass filter means (FC).

2. The apparatus according to claim 1, wherein the apparatus comprises a pipeline architecture, in which the color image data filtered by the mosaic filter are pixel-wise loaded into the memory (51) based on a clock signal and the processing of the color image data in the low-pass means (FC), the high-pass means (FH) and the adding means (84-87) is performed by a processor (53) which regularly outputs color image data for a color interpolated resultant pixel based on the clock signal in dependence on the clock signal.

3. The apparatus according to claim 2, wherein coefficients of the low-pass filter matrices (F1-F4) are arranged in such a manner that calculations in relation to the local environment (52) are horizontally and vertically mirror-symmetrical and rotational symmetrical by 90°.

4. The apparatus according to claim 1, wherein the high-pass filter means (FH) comprises a noise reduction means (N) which is controllable by a setting parameter (NV).

5. The apparatus according claim 1, wherein the color components comprise the colors red, green, blue and infra-red.

6. The apparatus according to claim 1, wherein the filter masks are each formed of a matrix (F1-F4), and wherein the low-pass filter means (FC) and the high-pass filter means (FH) are arranged to multiply data values of the pixels by filter values indicated at corresponding positions in the matrix (F1-F4), to add up the obtained products of all pixels of the local environment (52), and to multiply the result by a common factor allocated to the matrix.

7. The apparatus according to claim 6, wherein the filter values of the matrices (F1-F4) of the filter masks comprise positive or negative powers of two, only, and the product of the sum of all filter values and the common factor amounts to the value of one.

8. The apparatus according to claim 1, wherein the high-pass filter means (FH) comprises an image sharpening means (S) which is controllable by a setting parameter (SV).

9. The apparatus according to claim 6, wherein the filter values of the matrix of the high-pass filter means (FH) comprise positive and negative powers of two, only, and the sum of all filter values is zero.

10. The apparatus according to claim 4, wherein the noise reduction means (N) is arranged to apply a non-linear function which runs through the origin of the coordinate system for achieving the noise reduction, and the gradient of which in the origin is smaller than at at least one position remote from the origin.

11. Apparatus according to claim 10, wherein the function is a piece-wise linear function.

12. Digital camera comprising an apparatus according to claim 1.

13. The apparatus according to claim 1, arranged to be connected to a digital camera comprising the image sensor (31).

14. A method of processing an image information from an image sensor (31) having a two-dimensional pixel arrangement, wherein the method comprises:
  filtering the image information obtained from the image sensor by means of mosaic filter which comprises a two-dimensionally periodically repeating two-dimensional filter basis (40) consisting of several different color components;
  building a two-dimensional local environment (52) with a predetermined number of pixels from stored color image data filtered by the mosaic filter;
  low-pass filtering the color image data of the local environment (52), wherein for each of the color components another low-pass filter mask of a group of low-pass filter masks (F1-F4) available for each phase position (60-63) of the local environment (52) with respect to the periodic filter basis (40) is selected in dependence on the actual phase position and applied to the local environment (52), wherein in the respective low-pass filter mask (F1-F4) each of the filter values which are to be multiplied with the color values of other color components are zero, and wherein the phase position indicates the spatial arrangement of the color components of the pixels in the local environment (52);
  high-pass filtering all color image data of the local environment (52) by a predetermined high-pass filter mask, which is independent from the phase position, for obtaining a common high frequency component (93) of the color image data; and
  adding the high-pass filtered common high frequency component (93) to corresponding low-pass filtered color image data (80-83).

15. A non-transitory machine-readable data storage medium, comprising a software product recorded on the non-transitory machine-readable data storage medium, the software product being executable on a computing hardware of a computing device, to execute the image processing method according to claim 14.

* * * * *